(12) United States Patent
Nishida et al.

(10) Patent No.: US 10,385,942 B2
(45) Date of Patent: Aug. 20, 2019

(54) PENDULUM VIBRATION DAMPER

(71) Applicant: TOYOTA JIDOSHA KABUSHIKI KAISHA, Toyota-shi, Aichi-ken (JP)

(72) Inventors: Hideyuki Nishida, Shizuoka-ken (JP); Hiroyuki Amano, Susono (JP); Shuhei Horita, Okazaki (JP); Yuji Suzuki, Kariya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/056,856

(22) Filed: Aug. 7, 2018

(65) Prior Publication Data

US 2019/0048971 A1 Feb. 14, 2019

(30) Foreign Application Priority Data

Aug. 9, 2017 (JP) .................. 2017-153978

(51) Int. Cl.
*F16H 45/02* (2006.01)
*F16F 15/14* (2006.01)
*F16F 15/31* (2006.01)

(52) U.S. Cl.
CPC ............ *F16F 15/145* (2013.01); *F16F 15/31* (2013.01); *F16F 2222/08* (2013.01); *F16F 2232/02* (2013.01); *F16H 45/02* (2013.01); *F16H 2045/0263* (2013.01)

(58) Field of Classification Search
CPC . F16F 15/145; F16H 2045/0263; F16H 45/02
See application file for complete search history.

(56) References Cited

U.S. PATENT DOCUMENTS

| | | | |
|---|---|---|---|
| 6,374,698 B1* | 4/2002 | Carlson | F16F 15/145 192/207 |
| 2012/0222515 A1* | 9/2012 | Kinoshita | F16F 15/145 74/572.2 |
| 2014/0066216 A1* | 3/2014 | Tone | F16F 15/145 464/160 |
| 2016/0169318 A1* | 6/2016 | Miyahara | F16F 15/145 188/378 |
| 2016/0169319 A1 | 6/2016 | Tsukano et al. | |
| 2016/0169320 A1* | 6/2016 | Suzuki | F16F 15/145 188/378 |
| 2016/0327118 A1* | 11/2016 | Miyahara | F16F 15/145 |

FOREIGN PATENT DOCUMENTS

JP 2016114170 A 6/2016

* cited by examiner

*Primary Examiner* — Vicky A Johnson
(74) *Attorney, Agent, or Firm* — Hunton Andrews Kurth LLP (57) ABSTRACT

A pendulum vibration damper in which a retainer is prevented from being moved or tilted in an axial direction. In the pendulum vibration damper, a restriction member formed on any one of the retainer and an inner face of the casing to be brought into contact to the other one of the retainer and the inner face of the casing when the retainer is moved or tilted in an axial direction of the rotary disc. A clearance between the casing and the rolling mass in the axial direction is shorter than a thickness of the retainer in the axial direction.

7 Claims, 7 Drawing Sheets

PENDULUM VIBRATION DAMPER

The present invention claims the benefit of Japanese Patent Application No. 2017-153978 filed on Aug. 9, 2017 with the Japanese Patent Office, the disclosure of which is incorporated herein by reference in its entirety.

BACKGROUND

Field of the Invention

The present invention relates to the art of a torsional vibration damper that suppresses torsional vibrations by a pendulum motion of a inertia mass.

Discussion of the Related Art

JP-A-2016-114170 describes one example of a torsional vibration damper. In the damper taught by JP-A-2016-114170, a plurality of chambers are formed in a rotary disc, and a rolling mass is individually held in each of the chambers. When the rotary disc is rotated, each of the rolling mass is centrifugally pushed onto a raceway surface of the chamber while being oscillated by torque pulses, and torsional vibrations resulting from the torque pulses are damped by the oscillating motions of the rolling masses.

The damper taught by JP-A-2016-114170 is provided with a retainer that retains the rolling masses in the chambers while maintaining intervals between the rolling masses. The retainer comprises a ring portion opposed to the rotary disc, and a plurality of pairs of stopper portions extending radially outwardly from the ring portions to form holder portions individually holding the rolling mass therein. An outer circumferential portion of the rotary disc, the rolling masses, and the retainer are covered by a casing.

As described, in the damper taught by JP-A-2016-114170, each of the rolling mass is centrifugally pushed onto the raceway surface of the chamber while being oscillated by the torque pulse along the raceway surface, when the rotary disc is rotated. In this situation, the rolling masses are tilted or moved in an axial direction of the rotary disc by a disturbance such as vibration of the engine, the retainer is also tilted or moved in the axial direction. Consequently, the rolling mass may be disengaged from the retainer, or the retainer may be jammed between the rolling mass and the casing. As a result, the rolling mass may not be held properly by the retainer, and hence the rolling mass may not be allowed to oscillate along a designed orbit.

SUMMARY OF THE INVENTION

The present disclosure has been conceived noting the foregoing technical problems, and it is therefore an object of the present disclosure is to provide a pendulum vibration damper in which a retainer is prevented from being moved or tilted in an axial direction.

The present disclosure relates to a pendulum vibration damper comprising: a rotary disc that is rotated by a torque; a plurality of bores formed in the rotary disc in a circular manner; a plurality of rolling masses held respectively in the bores while being allowed to be oscillated by pulsation of the torque applied to the rotary disc to suppress vibrations; a retainer that retains the rolling masses in the bores while maintaining intervals between the masses, and that is allowed to be rotated relatively to the rotary disc by an oscillating motion of the mass; and a casing that covers the retainer, the rolling masses, and the rotary disc. In order to achieve the above-explained objective, according to the embodiment of the present disclosure, the pendulum vibration damper is provided with a restriction member formed on any one of the retainer and an inner face of the casing to be brought into contact to the other one of the retainer and the inner face of the casing when the retainer is moved or tilted in an axial direction of the rotary disc. A clearance between the casing and the rolling mass in the axial direction is shorter than a thickness of the retainer in the axial direction.

In a non-limiting embodiment, the restriction member may be formed on the retainer while protruding toward the inner face of the casing.

In a non-limiting embodiment, the retainer may comprise a ring portion formed radially inner side of the bores, and a plurality of holder portions individually formed of a pair of stopper portions protruding radially outwardly from the ring portion to hold the rolling mass from both sides in a circumferential direction of the rotary disc. For example, the restriction member may be formed on the stopper portion.

In a non-limiting embodiment, the restriction member may be formed on a leading end of the stopper portion.

In a non-limiting embodiment, the retainer may comprises a ring portion formed radially inner side of the bores, and a plurality of holder portions individually formed of a pair of stopper portions protruding radially outwardly from the ring portion to hold the rolling mass from both sides in a circumferential direction of the rotary disc. The restriction member may be formed on the inner face of the casing while protruding toward the stopper portion.

In a non-limiting embodiment, the casing may include a first case member and a second case member, the retainer may be arranged on both sides of the rotary disc in the axial direction, the restriction member may be formed on the stopper portion of each of the retainers, and sizes of the restriction members may be identical to each other.

In a non-limiting embodiment, sizes of the restriction members formed on the stopper portions of the retainers may be different from each other.

In a non-limiting embodiment, the restriction member may be formed on the inner faces of the first case member and the second case member, and sizes of the restriction members may be identical to each other.

In a non-limiting embodiment, sizes of the restriction members formed on the inner faces of the first case member and the second case member may be different from each other.

In a non-limiting embodiment, shapes of the first case member and the second case member may be different from each other.

Thus, according to the embodiment of the present disclosure, the restriction member is formed on any one of the retainer and the inner face of the casing to restrict an axial movement of the retainer. In the pendulum vibration damper, each of the rolling masses centrifugally pushed onto the raceway surface of the bore of the rotary disc is oscillated by the torque pulse within the bore of the rotary disc to suppress torsional vibrations. In this situation, when the retainer is moved or tilted in the axial direction, the restriction member is brought into contact to the inner face of the casing or the retainer to restrict an axial movement of the retainer. According to the embodiment, the clearance between the casing and the rolling mass in the axial direction is shorter than a thickness of the retainer in the axial direction. For these reasons, the retainer is allowed to hold the rolling masses in a correct posture at a proper position so that each of the rolling masses is allowed to oscillate accurately along a designed orbit.

According to the embodiment, therefore, the retainer is prevented from sticking into the clearance between the rolling mass and the inner face of the casing. When the rotary disc is rotated slowly or stopped, the rolling masses are gravitationally dropped in the bores. In this situation, since the retainer is prevented from being tilted by the restriction member, the rolling masses are allowed to balance on the stopper portion of the retainer.

In addition, the restriction member is formed on one of the inner face of the casing and the retainer at the first portion to be brought into contact to the other one of the inner face of the casing and the retainer when the retainer is tilted. For this reason, an axial length and a weight of the restriction member can be minimized.

Further, the configuration of the casing and the restriction member may be altered arbitrarily in accordance with shapes of members adjacent to the pendulum vibration damper.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Figure 1:
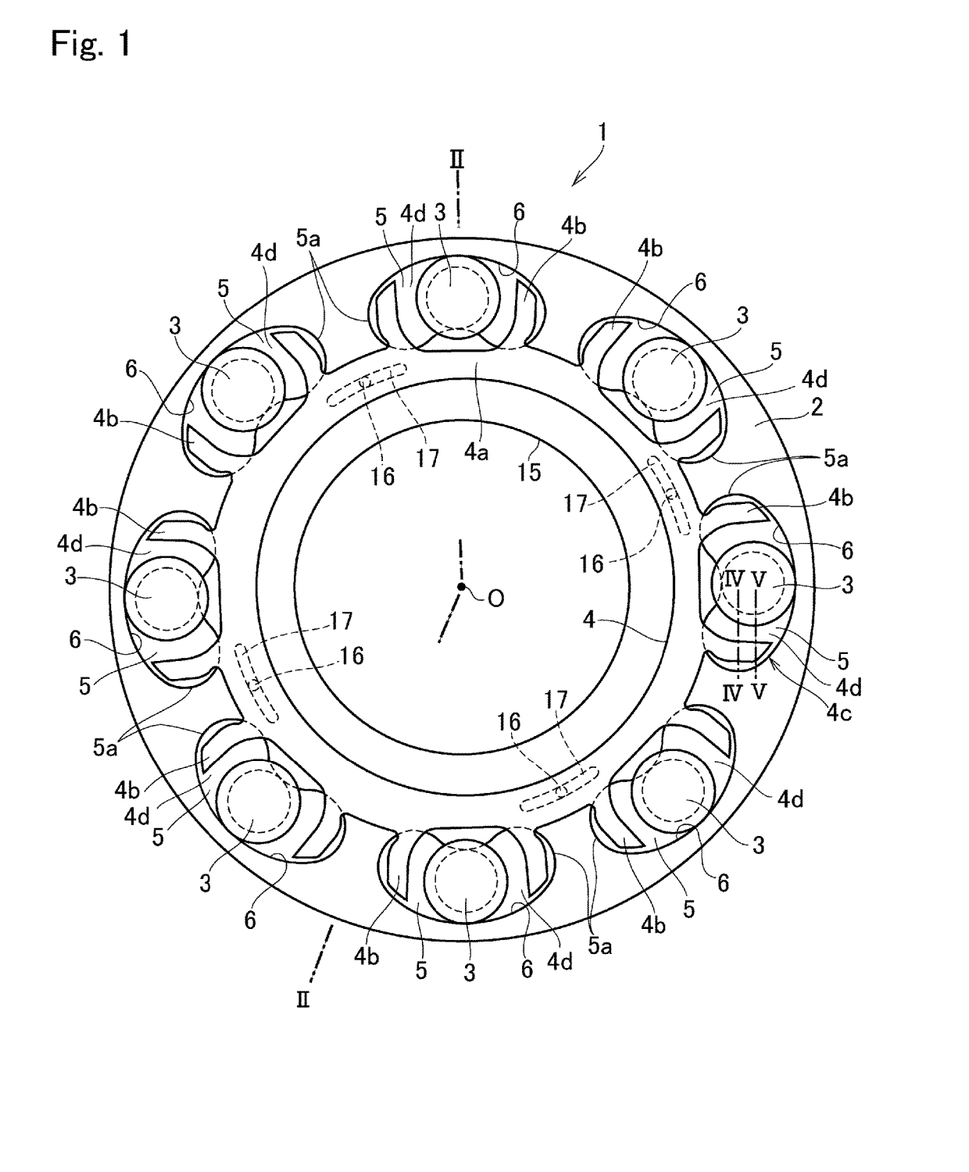
FIG. 1 is a front view showing the pendulum vibration damper according to at least one embodiment of the present disclosure.

Preferred embodiments of the present application will now be explained with reference to the accompanying drawings. Turning now to FIG. 1, there is shown a preferred embodiment of the pendulum vibration damper 1 for suppressing torsional vibrations in a vehicle resulting from pulsation of torque of an engine by oscillating motions of masses. The pendulum vibration damper 1 comprises a rotary disc 2 that is rotated by the torque of the engine, a plurality of rolling masses 3 held in the rotary disc 2, and a ring-shaped retainer 4 having a plurality of holder portions 4d individually holding the rolling mass 3 therein.

The rotary disc 2 is an annular plate member having a center hole 15, and a crankshaft of the engine, a propeller shaft, or an axle shaft for transmitting torque to a drive wheel (neither of which are shown) are inserted into the center hole 15. That is, the rotary disc 2 is mounted on the crankshaft, the propeller shaft, or the axle shaft to be rotated integrally, and torsional vibrations may be caused by pulsation of the engine torque. In the rotary disc 2, a plurality of bores 5 are formed in a circular manner around a rotational center O at substantially even intervals.

Each of the bores 5 is individually formed to penetrate through the rotary disc 2 in a thickness direction, and for example, individually shaped into a kidney-shape that allows the rolling mass 3 to be oscillated by pulsation of the torque applied to the rotary disc 2. Specifically, each of the bore 5 is curved inwardly so that a curvature radius of each of the bore 5 is shorter than that of the rotary disc 2 with respect to the center point O. Instead, the bore 5 may also be shaped into a jellybean-shape or an exact circle.

A radially outer portion of an inner circumferential edge of the bore 5 serves as a raceway surface 6 on which the rolling mass 3 rolls. Specifically, the raceway surface 6 is curved inwardly so that a curvature radius of the raceway surface 6 is shorter than that of rotary disc 2.

Figure 2:
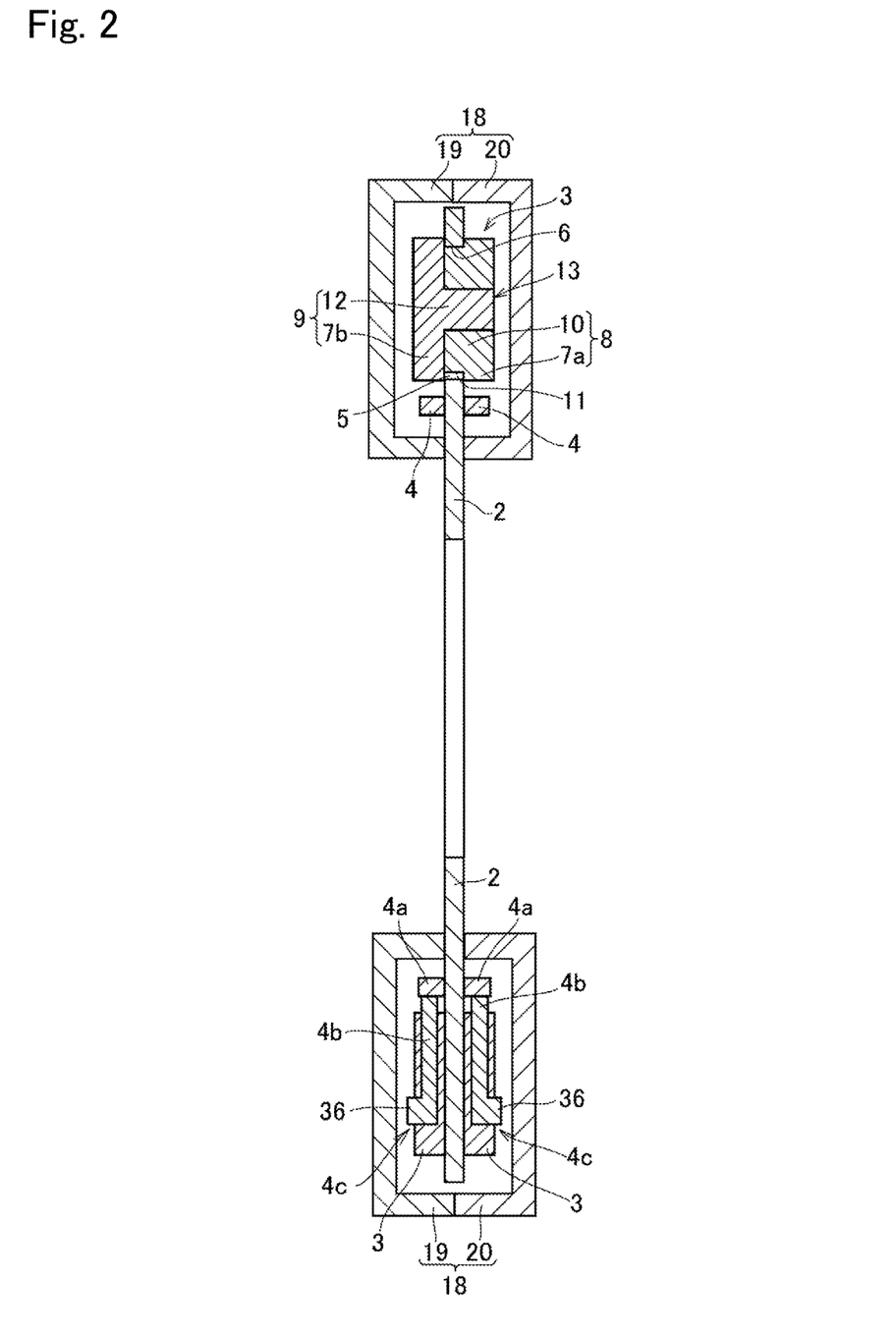
FIG. 2 is a cross-sectional view showing a cross-section of the pendulum vibration damper along II-II line shown in FIG. 1.

A structure of the rolling mass 3 is shown in FIG. 2. As illustrated in FIG. 2, the rolling mass 3 is a column or cylindrical member having an H-shaped cross-section. According to the embodiment, the rolling mass 3 is formed by combining a female member 8 as a first piece and a male member 9 as a second piece. Specifically, the rolling mass 3 comprises a trunk 10 as a diametrically-smaller cylindrical shaft portion of the female member 8, and a pair of diametrically-larger flange portions 7a, 7b formed on both sides of the trunk 10. When the rotary disc 2 is rotated, an outer circumferential face of the trunk 10 is centrifugally brought into contact to the raceway surface 6, and the flange portion 7a of the female member 8 and the flange portion 7b of the male member 9 are respectively brought into contact to the rotary disc 2 to prevent detachment of the rolling mass 3 from the bore 5.

Specifically, the female member 8 comprises the above-mentioned flange portion 7a, and the cylindrical shaft portion as the trunk 10 of the rolling mass 3 protruding from the flange portion 7a toward the male member 9 to penetrate through the bore 5. That is, a length of the trunk 10 in an axial direction is longer than a thickness of the rotary disc 2, and an outer diameter of the flange portion 7a is larger than an opening width of the bore 5. In order to allow the rolling mass 3 to smoothly oscillate in the bore 5, an outer diameter of the trunk 10 of the rolling mass 3 is slightly smaller than a clearance between the raceway surface 6 and a radially inner portion of the inner circumferential edge of the bore 5. That is, there is a slight clearance or a play between an outer circumferential face 11 of the trunk 10 of the rolling mass 3 and the inner circumferential edge of the bore 5. Thus, the outer circumferential face 11 of the trunk 10 is centrifugally brought into contact to the raceway surface 6.

On the other hand, the male member 9 comprises the above-mentioned flange portion 7b, and a shaft portion 12 protruding from the flange portion 7b to be inserted into an insertion hole 13 of the cylindrical shaft portion (i.e., the trunk 10) of the female member 8. Specifically, a length of the shaft portion 12 in the axial direction is substantially identical to a total axial length of the cylindrical shaft portion and the flange portion 7a of the female member 8, and an outer diameter of the shaft portion 12 is substantially equal to or slightly smaller than an inner diameter of the cylindrical shaft portion of the female member 8. An outer diameter of the flange portion 7b of the male member 9 is also larger than an opening width of the bore 5. In the rolling mass 3 thus structured, the flange portion 7a of the female member 8 and the flange portion 7b of the male member 9 are opposed to each other across the trunk 10.

In the pendulum vibration damper 1, a pair of the retainers 4 is arranged on both sides of the rotary disc 2. Each of the retainers 4 individually comprises a ring portion 4a and a plurality of holder portions 4d formed around the ring portion 4a. Specifically, an inner diameter of the ring portion 4a is larger than an inner diameter of the through center hole 15 of the rotary disc 2, and an outer diameter of the ring portion 4a is slightly smaller than a distance between radially innermost portions of the bore 5 opposed to each other through the center point O.

Each of the holder portions 4d comprises a pair of stopper portions 4b individually protruding radially outwardly from the ring portion 4a to the vicinity of the raceway surface 6 of the rotary disc 2 so as to restrict an oscillating range of the rolling mass 3 from both sides. Specifically a clearance between the pair of stopper portions 4b is wider than the outer diameters of the flange portions 7a, 7b so that the rolling mass 3 is held loosely in the holder portion 4d. In addition, in order to prevent the rolling mass 3 from colliding with circumferential ends 5a of the bore 5, the clearance between the pair of stopper portions 4b is narrower than a circumferential length (or width) of the bore 5. In order to reduce weight and sliding resistance, for example, the retainer 4 is formed of resin material.

In order to allow the pair of retainers 4 to rotate integrally around the center point O of the rotary disc 2, a plurality of guide holes 17 are formed on the rotary disc 2 at a level corresponding to the ring portion 4a of the retainer 4, and inner faces of the retainers 4 are connected through a plurality of guide pins 16 individually penetrating through the guide hole 17 of the rotary disc 2. Each of the guide holes 17 has a predetermined length in the circumferential direction, and each of the guide holes 17 is individually formed into an oval holes slightly curved along an orbit of the guide pins 16. In other words, each of the guide holes 14 is individually shaped into an arcuate shape.

Each of the guide pins 16 extends in parallel with a rotational center axis of the rotary disc 2, and a diameter of each of the guide pins 16 is substantially equal to or slightly smaller than an opening width of the guide hole 17. In the pendulum vibration damper 1, therefore, the pair of retainers 4 is allowed to rotate integrally around the center point O of the rotary disc 2 and relatively to the rotary disc 2 within the circumferential length of the guide hole 17. Since the retainers 4 are not subjected to a load holding the rolling masses 3, the retainers 4 are allowed to rotate smoothly. Alternatively, the guide pins 16 may also be formed on both faces of the rotary disc 2 in such a manner as to protrude toward retainers 4, and the guide holes 17 may also be formed on the inner face of each of the retainer 4. The pair of retainers 4 thus joined to each other is allowed to move freely in the axial direction.

In order to effectively suppress the torsional vibrations on the rotary shaft resulting from pulsation of torque applied to the rotary disc 2, it is preferable to allow the rolling masses 3 to oscillate smoothly. To this end, if the pendulum vibration damper 1 is used e.g., in a fluid coupling, an outer circumferential portion of the rotary disc 2 may be covered liquid-tightly by a casing 18 as depicted in FIG. 2, so as to protect the bores 5, the rolling masses 3 and the retainers 4 from fluid flowing in the fluid coupling.

The casing 18 includes a first case member 19 and a second case member 20, and has a rectangular cross-sectional shape. The casing 18 covers an outer circumferential portion of the rotary disc 2 and the pair of retainers 4, and an outer circumferential ends of the first case member 19 and the second case member 20 are joined to each other by welding or the like. A thickness of the casing 18 in the axial direction is set in such a manner that each of the rolling masses 3 is allowed to oscillate within the bore 5 without contacting to inner faces of the casing 18. In this case, since the retainers 4 may be supported by the casing 18, the guide pins 16 and the guide holes 17 may be omitted.

Figure 3:
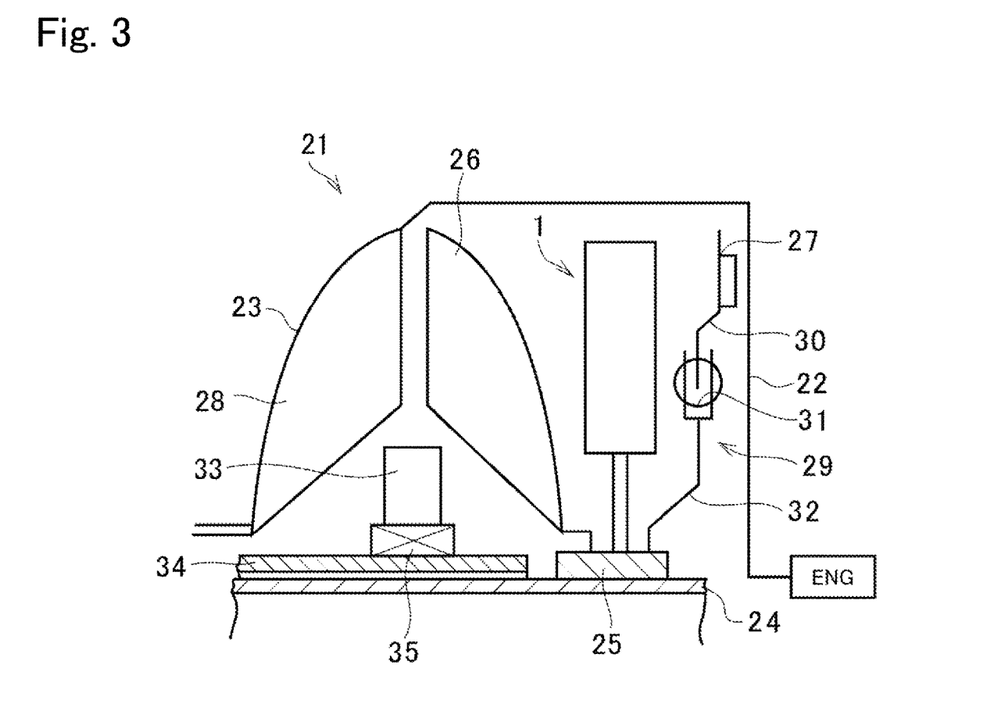
FIG. 3 is a schematic illustration showing a structure of a torque converter having the pendulum vibration damper shown in FIG. 1.

In FIG. 3, there is schematically shown a torque converter 21 having the pendulum vibration damper 1 according to the embodiment. A front cover 22 extending from the engine is connected to a pump shell 23 to form a housing of the torque converter 21, and an input shaft 24 of a not shown transmission penetrates through a center axis of the housing. A turbine hub 25 is fitted onto the input shaft 24 to be rotated integrally therewith while being connected to a turbine runner 26, a lockup clutch 27, and the pendulum vibration damper 1.

As known in the conventional art, the turbine runner 26 is opposed to a pump impeller 28 to be rotated by a spiral oil flow created by the pump impeller 28. The lockup clutch 27 is hydraulically engaged with an inner face of the front cover 22 to enable torque transmission, and the torque transmission is interrupted by reducing hydraulic pressure applied to the lockup clutch 27 to withdrawn the lockup clutch 27 from the front cover 22. The lockup clutch 27 is also connected to the turbine hub 25 through a lockup damper 29 adapted to absorb vibrations elastically by a coil spring. Specifically, the lockup damper 29 comprises a drive member 30 connected to the lockup clutch 27 and a driven member 32 connected not only to the drive member 30 through a coil spring 31 but also to the turbine hub 25. Both of the drive member 30 and the driven member 32 are annular plate members. A stator 33 is disposed between the pump impeller 28 and the turbine runner 26 in an inner circumferential side of those members. The stator 33 is engaged to a fixed shaft 34 also fitted onto the input shaft 24 through a one-way clutch 35. The pendulum vibration damper 1 is disposed between the turbine runner 26 and the lockup clutch 27 or the lockup damper 29.

As described, when the rotary disc 2 is rotated, the rolling mass 3 is centrifugally pushed onto the raceway surface 6, and oscillated along the raceway surface 6 by the torque pulse. On the other hand, the retainer 4 is allowed not only to rotate within the guide hole 17 but also to move in the axial direction. Therefore, if the rolling mass 3 is moved or tilted in the axial direction e.g., by vibrations of the engine, the retainer 4 may be moved or tilted by the rolling mass 3 thus moved or tilted. Consequently, the retainer 4 may stick into a clearance between the rolling mass 3 and the casing 18. In order to prevent such disadvantage, according to the embodiment, a travel amount and a tilt angle of the retainer 4 in the axial direction are restricted.

To this end, each of the retainer 4 is individually provided with a projection 36 as a restriction member that protrudes toward the inner face of the casing 18 from a leading end 4c of the stopper portion 4b. That is, a distance between the retainer 4 and the inner face of the casing 18 is reduced by the projection 36. In the casing 18, therefore, the projection 36 will be brought into contact to the first case member 19 or the second case member 20 when the retainer 4 is tilted thereby preventing detachment of the retainer 4 from the rolling mass 3. In other words, a travel amount and a tilt angle of the retainer 4 in the axial direction are reduced by the projection 36.

Specifically, an axial length of the projection 36 is set in such a manner that a distance between the casing 18 and the rolling mass 3 in the axial direction becomes shorter than a thickness of the retainer 4 in the axial direction when the retainer 4 is tilted or moved toward the inner face of the casing 18. In other words, a thickness of the retainer 4 including the projection 36 in the axial direction is thicker than the distance between the casing 18 and the rolling mass 3 in the axial direction. Here, it is to be noted that the definition of the "distance between the casing 18 and the rolling mass 3" is the shortest distance between the casing 18 and the rolling mass 3. That is, "the shortest distance between the casing 18 and the rolling mass 3" is a distance between the casing 18 and a portion of the tilted rolling mass 3 closest to the casing 18.

For example, when the projection 36 of the retainer 4 comes e.g., into contact to the inner face of the first case member 19, the retainer 4 is isolated away from the rotary disc 2 in the axial direction. In this situation, the flange portions 7a and 7b are engaged with the raceway surface 6 of the bore 5 of the rotary disc 2 so that the rolling mass 3 remains aligned with the rotary disc 2 in the axial direction. According to at least one embodiment, however, a clearance between the rolling mass 3 and the inner face of the casing 18, e.g., the first case member 19 is shorter than the length of the projection 36 in the axial direction. For this reason, the retainer 4 and the rolling mass 3 can be maintained to overlap each other in the axial direction. In addition, a radial movement of the retainer 4 caused by the centrifugal force can be blocked by the projection 36 so that the retainer 4 is prevented from sticking into the clearance between the rolling mass 3 and the inner face of the casing 18.

Figure 4:
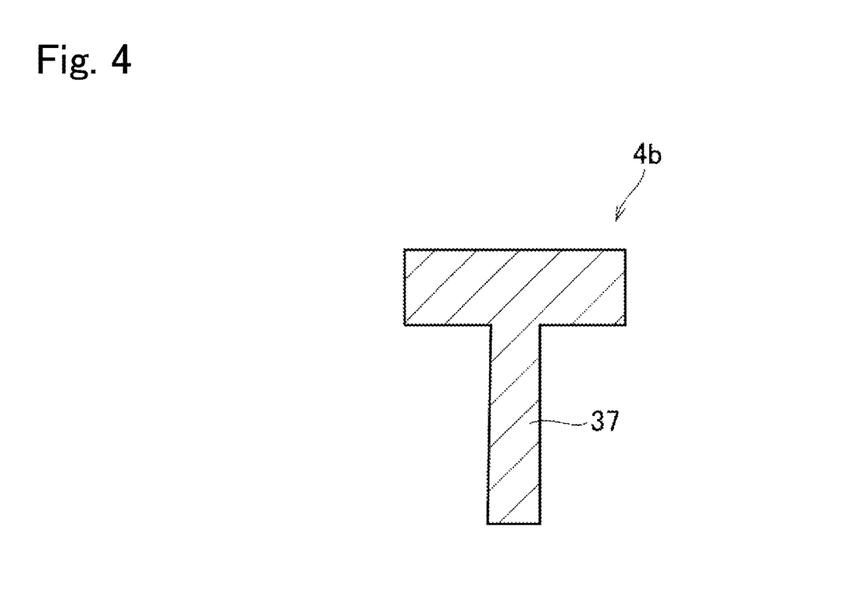
FIG. 4 is a cross-sectional view showing a cross-section of a stopper portion along IV-IV line shown in FIG. 1.
Figure 5:
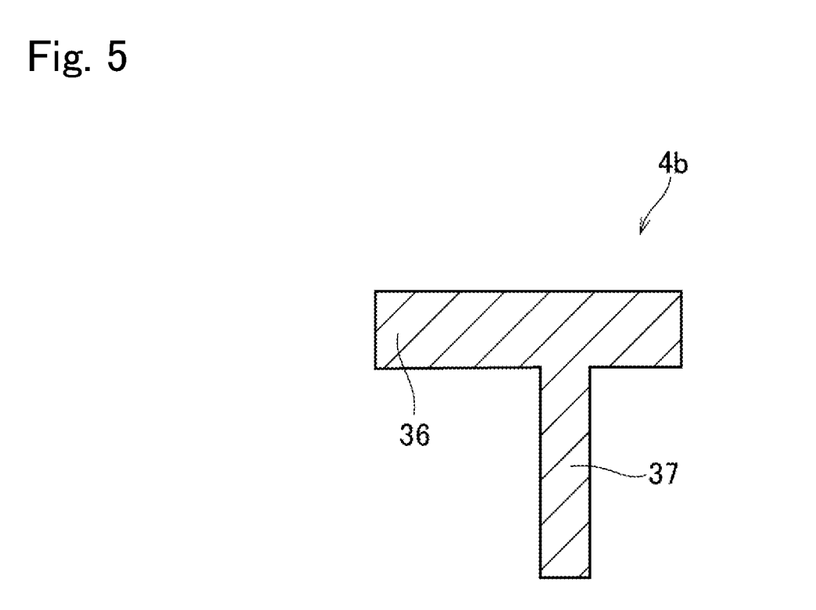
FIG. 5 is a cross-sectional view showing a cross-section of the stopper portion along V-V line shown in FIG. 1.

In order to enhance rigidity of the stopper portion 4b, a rib 37 is formed on a back face of the stopper portion 4b opposite to a face to which the rolling mass 3 comes into contact. FIG. 4 shows a cross-section of the stopper portion 4b along IV-IV line shown in FIG. 1. As shown in FIG. 4, a base portion of the stopper portion 4b has a symmetrical T shaped cross-section. On the other hand, FIG. 5 shows a cross-section of the stopper portion 4b along V-V line shown in FIG. 1. As shown in FIG. 5, the projection 36 is formed on the leading end 4c and hence the cross-section the leading end 4c of the stopper portion 4b is unsymmetrical.

Preferably, a weight of the retainer 4 is light as much as possible. According to the embodiment, in order not increase the weight of the retainer 4 significantly by the projection 36, the projection 36 is formed on the leading end 4c of the stopper portion 4b that is a first portion to be brought into contact to the inner face of the casing 18 when the retainer 4 is tilted. For this reason, a length of the projection 36 can be reduced as much as possible. As explained with reference to FIG. 3, the pendulum vibration damper 1 may be used in the torque converter 21. In this case, the casing 18 may be deformed by a centrifugal hydraulic pressure of the torque converter 21 and the projection 36 of the retainer 4 may be brought into contact undesirably. In order to avoid such disadvantage, according to the embodiment, a clearance is maintained between a leading end of the projection 36 and the inner face of the casing 18.

In the embodiment shown in FIG. 2, an axial distance between the first case member 19 and the rotary disc 2 and an axial distance between the second case member 20 and the rotary disc 2 are substantially identical to each other. Therefore, a length and a mass of the projection 36 protruding toward the first case member 19, and a length and a mass of the projection 36 protruding toward the second case member 20 are substantially identical to each other.

When the rotary disc 2 is rotated by the engine torque at a speed higher than a predetermined speed, the rolling mass 3 is centrifugally pushed onto the raceway surface 6 of the bore 5 at a circumferentially intermediate point that is a portion farthest from the center point O of the rotary disc 2. In this situation, the rolling mass 3 is oscillated within the bore 5 by an inertial torque resulting from pulsation of torque applied the rotary disc 2, and torsional vibrations of the rotary shaft resulting from the torque pulse is suppressed by such oscillating motion of the rolling mass 3. As described, according to the embodiment, the projection 36 is formed on the leading end 4c of the retainer 4 in such a manner as to protrude toward the inner face of the casing 18, and the clearance between the rolling mass 3 and the inner face of the casing 18 in the axial direction is shorter than a total thickness of the retainer 4 including the projection 36. According to the embodiment, therefore, the projection 36 is brought into contact to the casing 18 when the retainer 4 is moved or tilted in the axial direction thereby returning the retainer 4 to an original position. In addition, the retainer 4 is prevented from sticking into the clearance between the rolling mass 3 and the inner face of the casing 18. For these reasons, the retainer 4 is allowed to hold the rolling masses 3 in a correct posture at a proper position so that each of the rolling masses 3 is allowed to oscillate accurately along a designed orbit.

When the rotary disc 2 is rotated slowly and hence a centrifugal force applied to the rolling masses 3 is weak, the rolling masses 3 are gravitationally dropped in the bores 5. In this situation, for example, the rolling mass 3 situated about three o'clock position or nine o'clock position is tilted most significantly, and supported only by the lower stopper portion 4b of the holder portion 4d. Consequently, the retainer 4 is tilted by the rolling mass 3 situated about three o'clock position or nine o'clock position. However, according to the embodiment, the projection 36 is brought into contact to the inner face of the casing 18 to keep the retainer 4 in the correct posture so that the rolling mass 3 situated about three o'clock position or nine o'clock position balances on the lower stopper portion 4b of the holder portion 4d. In addition, the retainer 4 is prevented from sticking into the clearance between the rolling mass 3 and the inner face of the casing 18.

Further, since the projection 36 is formed on the leading end 4c of the stopper portion 4b, an increase in weight of the retainer 4 can be minimized. For this reason, it is unnecessary to arrange a separate member to restrict a travel amount of the retainer 4 in the axial direction so that a manufacturing cost is saved.

Sizes and designs of the first case member 19, the second case member 20, and the projection 36 may be altered according to need. Modification embodiments of the present disclosure will be explained hereinafter.

Figure 6A:
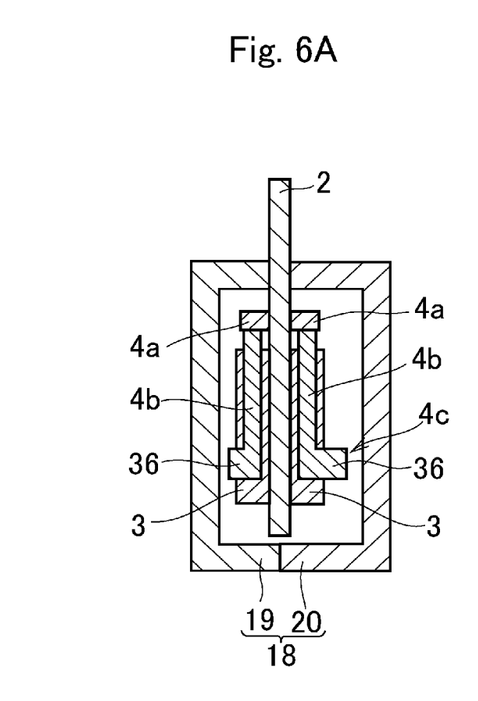
FIGS. 6A, 6B and 6C are partial cross-sectional views showing modifications of the example shown in FIG. 2.

In the embodiment shown in FIG. 6A, an axial distance between the first case member 19 and the rotary member 2 and an axial distance between the second case member 20 and the rotary member 2 are differentiated from each other. Specifically, the second case member 20 is formed such that the axial distance between the second case member 20 and the rotary member 2 is longer than the axial distance between the first case member 19 and the rotary member 2. In addition, the projection 36 of the retainer 4 held between the second case member 20 and the rotary member 2 is longer than the projection 36 of the retainer 4 held between the first case member 19 and the rotary member 2.

Figure 6B:
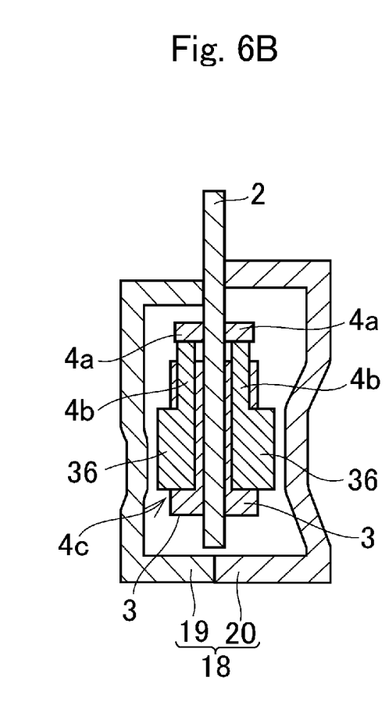
Figure 6C:
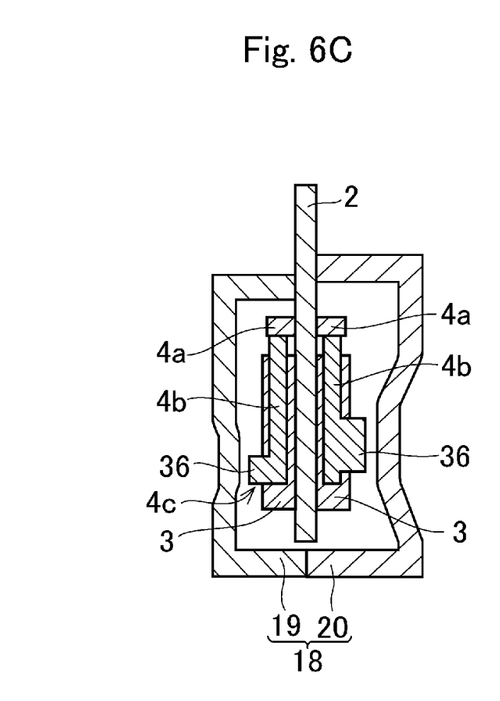

As illustrated in FIGS. 6B and 6C, the first case member 19 and the second case member 20 may be contoured along shapes of the turbine runner 26 of the torque converter 21 and the lockup damper 29 shown in FIG. 3. In the embodiment shown in FIG. 6B, sizes of the projections 36 of both of the retainers 4 are increased in the same amounts. In the embodiment shown in FIG. 6C, sizes and dimensions of the projections 36 of the retainers 4 are differentiated from each other. Specifically, in the retainer 4 held between the first case member 19 and the rotary member 2, the projection 36 is formed on the leading end 4c of the stopper portion 4b. On the other hand, in the retainer 4 held between the second case member 20 and the rotary member 2, the projection 36 is formed slightly radially inner side of the leading end 4c of the stopper portion 4b. In addition, the projection 36 of the retainer 4 held between the second case member 20 and the rotary member 2 is larger than the projection 36 of the retainer 4 held between the first case member 19 and the rotary member 2.

Figure 7:
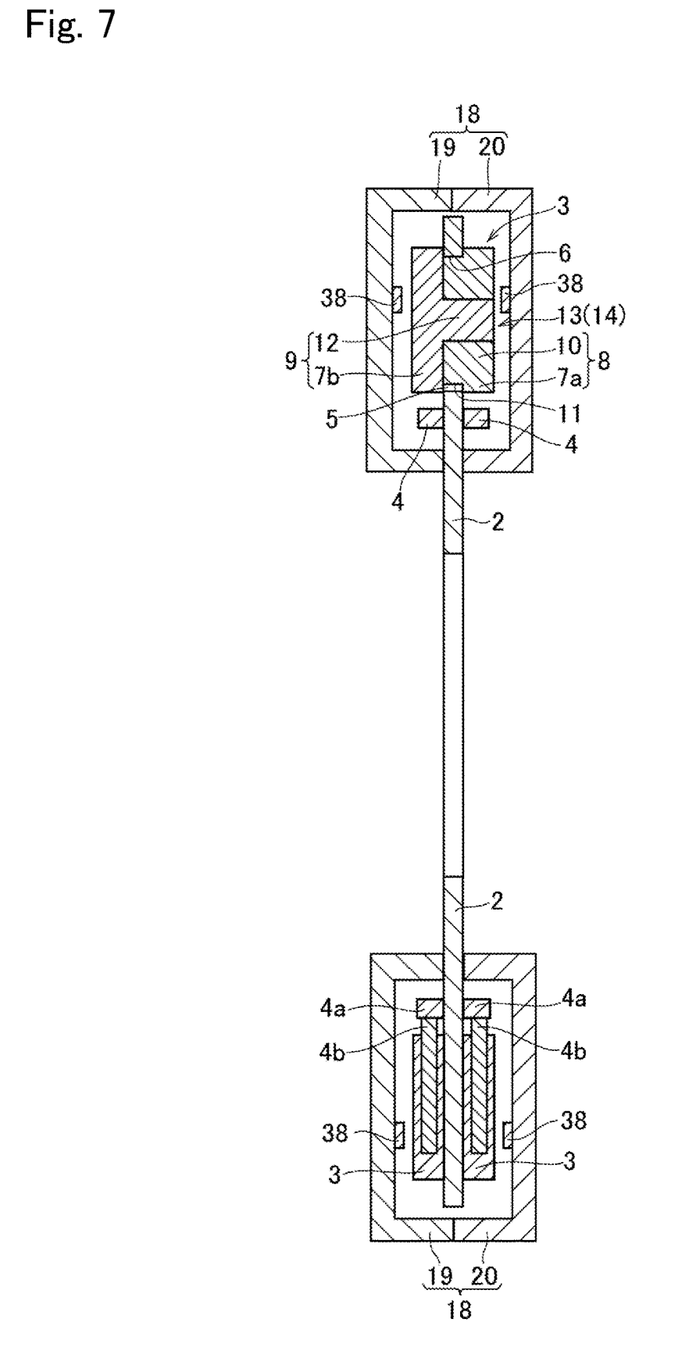
FIG. 7 is a cross-sectional view showing a cross-section of the pendulum vibration damper according to another embodiment.

Turning to FIG. 7, there is shown an embodiment in which projections 38 for restricting the axial movement of the retainers 4 are formed on the inner faces of the casing 18. Specifically, one of the projections 38 is formed on the inner face of the first case member 19 to protrude toward the stopper portion 4b of the retainer 4, and the other projection 38 is formed on the inner face of the second case member 20 to protrude toward the stopper portion 4b of the retainer 4. In the embodiment shown in FIG. 7, sizes and dimensions of the projections 38 are identical to each other.

In the embodiment shown in FIG. 7, when the retainer 4 comes into contact to the projection 38, a clearance between the casing 18 and the rolling mass 3 in the axial direction becomes shorter than the thickness of the retainer 4. That is, a clearance between the casing 18 and the rolling mass 3 in the axial direction is reduced by the projection 38. In other words, a clearance between the projection 38 and the rolling mass 3 is shorter than the thickness of the retainer 4.

Specifically, when the retainer 4 held between the rotary disc 2 and the first case member 19 comes into contact to the projection 38, a clearance between the rotary disc 2 and the retainer 4 is shorter than a clearance between the rolling mass 3 and the first case member 19.

The projection 38 is formed on the inner face of the casing 18 along the orbit of oscillating motion of the rolling masses 3. As described, each of the rolling mass 3 is allowed to move in the axial direction within a width of the trunk 10 formed between he flange portion 7a and the flange portion 7b. Therefore, a predetermined clearance is maintained between the projection 38 and the rolling masses 3. For example, the projection 38 may be formed in a circular manner on the inner face of the casing 18. Instead, a plurality of the projections 38 may also be formed on the inner face of the casing 18 at predetermined intervals to be opposed to the stopper portions 4b. The projection 38 may also be formed of resin material.

Figure 8A:
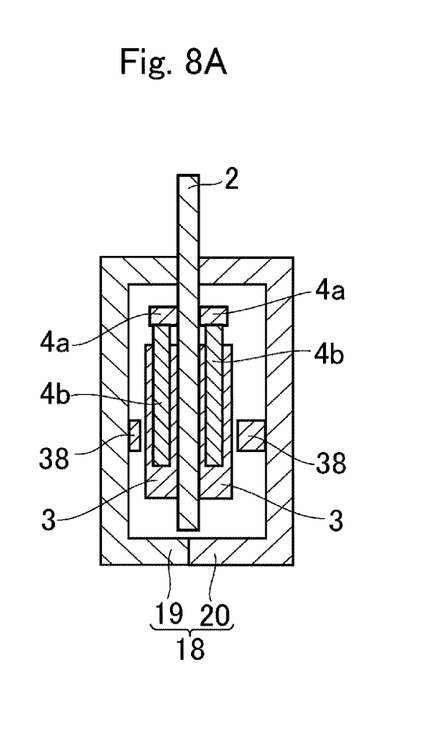
FIGS. 8A, 8B and 8C are partial cross-sectional views showing modifications of the example shown in FIG. 7.
Figure 8B:
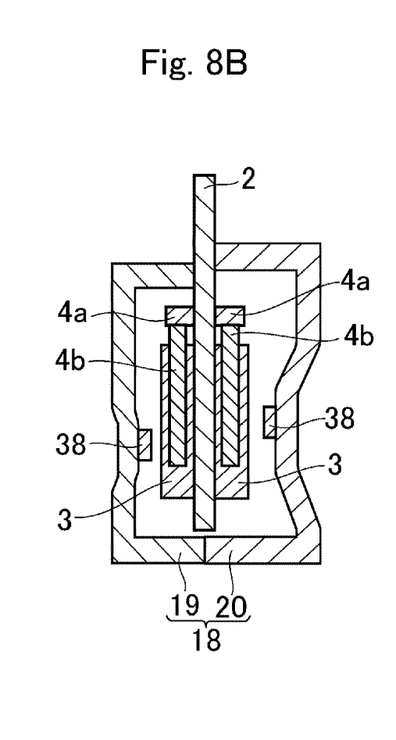
Figure 8C:
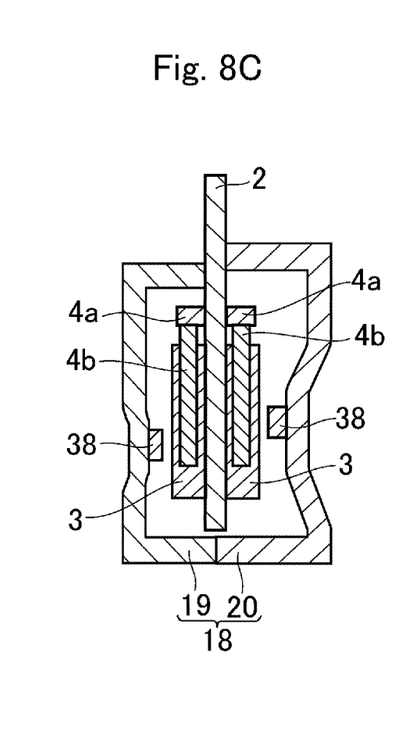

In the embodiment shown in FIG. 7, as illustrated in FIGS. 8A, 8B and 8C, sizes and designs of the first case member 19, the second case member 20, and the projection 38 may also be altered according to need. In the embodiment shown in FIG. 8A, the second case member 20 is formed such that the axial distance between the second case member 20 and the rotary member 2 is longer than the axial distance between the first case member 19 and the rotary member 2. In this case, size of the projection 38 formed on the second case member 20 is increased larger than the projection 38 formed on the first case member 19. In the embodiments illustrated in FIGS. 8B and 8C, the first case member 19 and the second case member 20 are also contoured along shapes of the turbine runner 26 of the torque converter 21 and the lockup damper 29 shown in FIG. 3. In the embodiment shown in FIG. 6B, sizes of the projections 38 of both of the first case member 19 and the second case member 20 are identical to each other. In the embodiment shown in FIG. 8C, size of the projection 38 of the second case member 20 is increased larger than the projection 38 of the first case member 19.

According to the embodiment shown in FIGS. 7, 8A, 8B and 8C, the projection 38 is brought into contact to the casing 18 when the retainer 4 is moved or tilted in the axial direction thereby returning the retainer 4 to an original position. In addition, the retainer 4 may also be prevented from sticking into the clearance between the rolling mass 3 and the inner face of the casing 18. For these reasons, the retainer 4 is allowed to hold the rolling masses 3 in a correct posture at a proper position so that each of the rolling masses 3 is allowed to oscillate accurately along a designed orbit.

Although the above exemplary embodiment of the present application has been described, it will be understood by those skilled in the art that the present disclosure should not be limited to the described exemplary embodiment, and various changes and modifications can be made within the scope of the present disclosure. For example, the projection as the restriction member may also be formed on the stopper portion 4b other than the leading end 4c. In a case of forming the projection on a base portion of the stopper portion 4b or on the ring portion 4a, rigidity of the retainer 4 may be enhanced.

In addition, the retainer 4 may also be arranged only on one side of the rotary disc 2. Further, one of the flange portions of the rolling mass 3, or both of the flange portions of the rolling mass 3 may be omitted. In this case, in order to prevent disengagement of the rolling mass 3 from the bore 5, it is preferable to increase a width of the trunk 10 of the rolling mass 3.

What is claimed is:
1. A pendulum vibration damper comprising:
a rotary disc that is rotated by a torque;
a plurality of bores formed in the rotary disc in a circular manner;
a plurality of rolling masses held respectively in the bores while being allowed to be oscillated by pulsation of the torque applied to the rotary disc to suppress vibrations;
a retainer that retains the rolling masses in the bores while maintaining intervals between the masses, and that is allowed to be rotated relatively to the rotary disc by an oscillating motion of the mass;
a casing that covers the retainer, the rolling masses, and the rotary disc; and
a restriction member formed on any one of the retainer and an inner face of the casing to be brought into contact to the other one of the retainer and the inner face of the casing when the retainer is moved or tilted in an axial direction of the rotary disc,
wherein a clearance between the casing and the rolling mass in the axial direction is shorter than a thickness of the retainer in the axial direction, and
wherein the restriction member is formed on the retainer while protruding toward the inner face of the casing.
2. The pendulum vibration damper as claimed in claim 1, wherein the retainer comprises a ring portion formed radially inner side of the bores, and a plurality of holder portions individually formed of a pair of stopper portions protruding radially outwardly from the ring portion to hold the rolling mass from both sides in a circumferential direction of the rotary disc, and
the restriction member is formed on the stopper portion.

3. The pendulum vibration damper as claimed in claim 2, wherein the restriction member is formed on a leading end of the stopper portion.

4. A pendulum vibration damper comprising:
a rotary disc that is rotated by a torque;
a plurality of bores formed in the rotary disc in a circular manner;
a plurality of rolling masses held respectively in the bores while being allowed to be oscillated by pulsation of the torque applied to the rotary disc to suppress vibrations;
a retainer that retains the rolling masses in the bores while maintaining intervals between the masses, and that is allowed to be rotated relatively to the rotary disc by an oscillating motion of the mass;
a casing that covers the retainer, the rolling masses, and the rotary disc; and
a restriction member formed on any one of the retainer and an inner face of the casing to be brought into contact to the other one of the retainer and the inner face of the casing when the retainer is moved or tilted in an axial direction of the rotary disc,
wherein a clearance between the casing and the rolling mass in the axial direction is shorter than a thickness of the retainer in the axial direction, and
wherein the casing includes a first case member and a second case member,
the retainer is arranged on both sides of the rotary disc in the axial direction,
the restriction member is formed on a stopper portion of each of the retainers, and
sizes of the restriction members are identical to each other.

5. A pendulum vibration damper comprising:
a rotary disc that is rotated by a torque;
a plurality of bores formed in the rotary disc in a circular manner;
a plurality of rolling masses held respectively in the bores while being allowed to be oscillated by pulsation of the torque applied to the rotary disc to suppress vibrations;
a retainer that retains the rolling masses in the bores while maintaining intervals between the masses, and that is allowed to be rotated relatively to the rotary disc by an oscillating motion of the mass;
a casing that covers the retainer, the rolling masses, and the rotary disc; and
a restriction member formed on any one of the retainer and an inner face of the casing to be brought into contact to the other one of the retainer and the inner face of the casing when the retainer is moved or tilted in an axial direction of the rotary disc,
wherein a clearance between the casing and the rolling mass in the axial direction is shorter than a thickness of the retainer in the axial direction, and
wherein the casing includes a first case member and a second case member,
the retainer is arranged on both sides of the rotary disc in the axial direction,
the restriction member is formed on a stopper portion of each of the retainers, and
sizes of the restriction members are different from each other.

6. A pendulum vibration damper comprising:
a rotary disc that is rotated by a torque;
a plurality of bores formed in the rotary disc in a circular manner;
a plurality of rolling masses held respectively in the bores while being allowed to be oscillated by pulsation of the torque applied to the rotary disc to suppress vibrations;
a retainer that retains the rolling masses in the bores while maintaining intervals between the masses, and that is allowed to be rotated relatively to the rotary disc by an oscillating motion of the mass;
a casing that covers the retainer, the rolling masses, and the rotary disc; and
a restriction member formed on any one of the retainer and an inner face of the casing to be brought into contact to the other one of the retainer and the inner face of the casing when the retainer is moved or tilted in an axial direction of the rotary disc,
wherein a clearance between the casing and the rolling mass in the axial direction is shorter than a thickness of the retainer in the axial direction,
wherein the casing includes a first case member and a second case member,
the retainer is arranged on both sides of the rotary disc in the axial direction,
the restriction member is formed respectively on the inner faces of the first case member and the second case member, and
sizes of the restriction members are different from each other.

7. A pendulum vibration damper comprising:
a rotary disc that is rotated by a torque;
a plurality of bores formed in the rotary disc in a circular manner;
a plurality of rolling masses held respectively in the bores while being allowed to be oscillated by pulsation of the torque applied to the rotary disc to suppress vibrations;
a retainer that retains the rolling masses in the bores while maintaining intervals between the masses, and that is allowed to be rotated relatively to the rotary disc b an oscillating motion of the mass;
a casing that covers the retainer, the rolling masses, and the rotary disc; and
a restriction member formed on any one of the retainer and an inner face of the casing to be brought into contact to the other one of the retainer and the inner face of the casing when the retainer is moved or tilted in an axial direction of the rotary disc,
wherein a clearance between the casing and the rolling mass in the axial direction is shorter than a thickness of the retainer in the axial direction, and
wherein the casing includes a first case member and a second case member, and
shapes of the first case member and the second case member are different from each other.

\* \* \* \* \*

UNITED STATES PATENT AND TRADEMARK OFFICE
CERTIFICATE OF CORRECTION

PATENT NO.           : 10,385,942 B2
APPLICATION NO.      : 16/056856
DATED                : August 20, 2019
INVENTOR(S)          : Nishida et al.

Page 1 of 1

It is certified that error appears in the above-identified patent and that said Letters Patent is hereby corrected as shown below:

In the Claims

At Column 12, Line 43, change "b an oscillating motion" to "by an oscillating motion"

Signed and Sealed this
Nineteenth Day of November, 2019

Andrei Iancu
*Director of the United States Patent and Trademark Office*